(12) United States Patent
Huang et al.

(10) Patent No.: US 9,836,204 B1
(45) Date of Patent: Dec. 5, 2017

(54) SCROLLING CONTROL FOR MEDIA PLAYERS

(71) Applicant: VisualOn, Inc., Santa Clara, CA (US)

(72) Inventors: Jiafa Huang, Shanghai (CN); Chin-Yee Lin, Los Gatos, CA (US)

(73) Assignee: VisualOn, Inc., San Jose, CA (US)

( * ) Notice: Subject to any disclaimer, the term of this patent is extended or adjusted under 35 U.S.C. 154(b) by 368 days.

(21) Appl. No.: 14/187,669

(22) Filed: Feb. 24, 2014

Related U.S. Application Data

(60) Provisional application No. 61/784,450, filed on Mar. 14, 2013.

(51) Int. Cl.
*G06F 3/048* (2013.01)
*G06F 3/0485* (2013.01)
*G06F 3/0481* (2013.01)

(52) U.S. Cl.
CPC ...... *G06F 3/04855* (2013.01); *G06F 3/04812* (2013.01); *G06F 2203/04808* (2013.01)

(58) Field of Classification Search
CPC ........... H04N 5/44543; H04N 21/4622; H04N 21/47; G11B 27/34; G11B 27/034; G09G 5/14; G09G 5/34; G06F 3/04855
USPC ......................................... 715/716, 784, 786
See application file for complete search history.

(56) References Cited

U.S. PATENT DOCUMENTS

| | | | | |
|---|---|---|---|---|
| 5,874,961 A * | 2/1999 | Bates | .................. | G06F 3/04855 715/786 |
| 6,204,846 B1 * | 3/2001 | Little | .................. | G06F 3/04855 715/784 |
| 6,677,965 B1 * | 1/2004 | Ullmann | ............. | G06F 3/04812 715/786 |
| 7,165,227 B2 * | 1/2007 | Ubillos | ............... | G06F 3/04855 345/661 |
| 7,380,216 B2 * | 5/2008 | Feig | .................... | G06F 3/04847 715/786 |
| 7,934,169 B2 * | 4/2011 | Reponen | ............... | G06F 3/0236 715/784 |
| 8,305,356 B1 * | 11/2012 | Jang | ....................... | G06F 3/0485 345/173 |
| 2007/0143706 A1 * | 6/2007 | Peters | ................. | G06F 3/04855 715/786 |
| 2007/0236475 A1 * | 10/2007 | Wherry | ................. | G06F 3/0485 345/173 |
| 2008/0165141 A1 * | 7/2008 | Christie | .................. | G06F 3/044 345/173 |
| 2010/0185976 A1 * | 7/2010 | Sadanandan | .......... | G06F 3/0485 715/786 |
| 2010/0231536 A1 * | 9/2010 | Chaudhri | .............. | G06F 3/0481 345/173 |
| 2011/0136543 A1 * | 6/2011 | Lan | ....................... | G06F 1/1626 455/566 |
| 2013/0241847 A1 * | 9/2013 | Shaffer | ................... | G06F 3/038 345/173 |

(Continued)

*Primary Examiner* — Joy M Weber
(74) *Attorney, Agent, or Firm* — Van Pelt, Yi & James LLP

(57) ABSTRACT

A system for scrolling comprises an interface and a processor. The interface is for: receiving a scrolling command; receiving a trigger to start precise scrolling; providing an indication to display a precise scrolling control; receiving a precise scrolling gesture; and providing an indication to display an output. The processor is for determining the output based at least in part on the scrolling command and the precise scrolling gesture.

21 Claims, 14 Drawing Sheets

(56) References Cited

U.S. PATENT DOCUMENTS

2014/0115478 A1* 4/2014 Moiseenko .......... G11B 27/105
715/723
2014/0359447 A1* 12/2014 Kannan .................. G06T 11/00
715/720

* cited by examiner

US 9,836,204 B1

SCROLLING CONTROL FOR MEDIA PLAYERS

This application claims priority to U.S. Provisional Patent Application No. 61/784,450 entitled LAYERED SLIDER-BAR filed Mar. 14, 2013 which is incorporated herein by reference for all purposes.

BACKGROUND OF THE INVENTION

People find it hard to slide or scroll to a precise value when using a sliderbar or scrollbar with a large range. For example, it is difficult to precisely scroll to the time 00:08:25 of a 2 hour long movie.

BRIEF DESCRIPTION OF THE DRAWINGS

Various embodiments of the invention are disclosed in the following detailed description and the accompanying drawings.

DETAILED DESCRIPTION

Figure 1A:
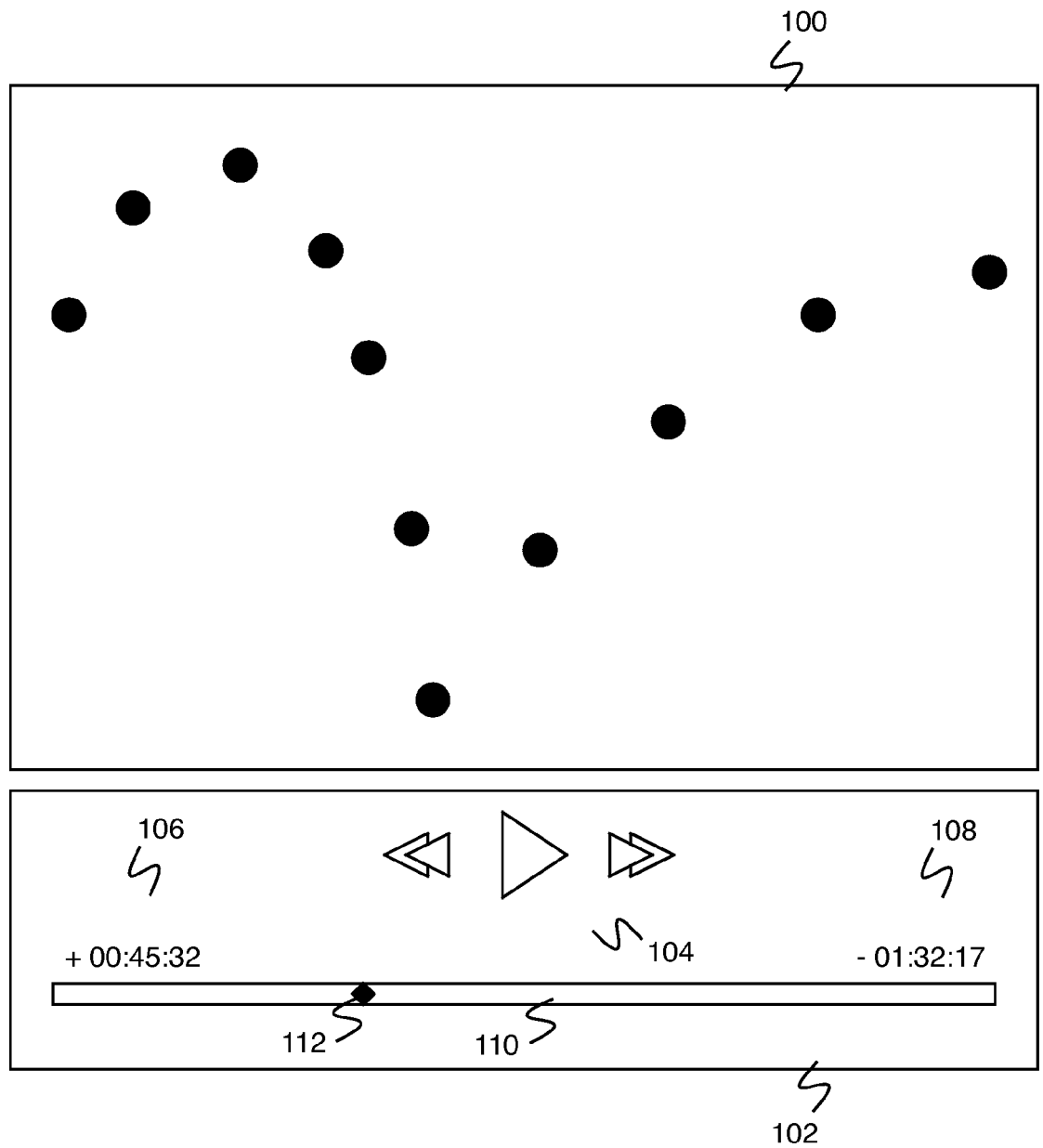
FIG. 1A is a diagram illustrating an embodiment of media player software.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a layered slider bar is disclosed. A method for scrolling comprises receiving a scrolling command; receiving a trigger to start precise scrolling; providing an indication to display a precise scrolling control; receiving a precise scrolling gesture; and providing an indication to display an output based at least in part on the scrolling command and the precise scrolling gesture.

In a media player software (e.g., an audio player, a video player, etc.), using a traditional slider bar it can be difficult to scroll to a precise (e.g., accurate to one second or less) point within a long (e.g., hours) file. This can create a problem, for instance, when watching a movie, as a user may desire to scroll backwards 30 seconds out of a two hour long file. The source of the problem is the limited dynamic range of the scrollbar—media player software may only be able to resolve hundreds of points horizontally, however one second is $\frac{1}{7200}$ of a two hour movie. This problem is particularly apparent on a small touch screen device—for example, a smartphone—where horizontal display range is limited due to the narrow screen, and where a user operates the interface with limited precision by touching with a finger. A system for a layered slider bar uses a combination of a coarse scrolling command and a precise scrolling command to precisely specify the desired point within the media file. A user first inputs a coarse scrolling command by indicating a point in a slider bar. The user then provides an indication to display a precise scrolling interface. The indication to display a precise scrolling interface comprises a gesture that is distinct from the initial scrolling command (e.g., moving in an orthogonal direction, placing a second finger on the display, etc.). A precise scrolling interface is displayed, and the user makes an indication on the precise scrolling interface to precisely specify the point in the displayed media file to scroll to. The precise scrolling interface comprises a secondary interface (e.g. a sub-scrollbar, a turnplate, etc.) that, when interacted with, causes the point in the displayed media file to change slowly.

In some embodiments, a system comprises an interface and a processor. The processor receives and provides display and control information to and from the interface. The processor determines based on inputs a set of outputs for display or control of the interface. The interface is configured to receive indications of gestures or touches that trigger a precision control mode for scrolling. The processor recognizes the trigger gesture and provides the interface with display information for a sub-widget for selecting a precise value during scrolling. The interface displays the sub-widget and receives indications of gestures or touches that control scrolling at a more precise or finer resolution that with a base sliderbar or scrollbar. The interface is configured to receive indications of gestures or touches that trigger return to a base control mode for scrolling.

FIG. 1A is a diagram illustrating an embodiment of media player software. The media player of FIG. 1A comprises a media player for playing any appropriate media (e.g., video, audio, etc.). In the example shown, media player 100 comprises video display 100 and controls 102. Video display 100 comprises a video display for displaying video media. Controls 102 comprise controls for the display of video media. Controls 102 comprise control buttons 104. Control buttons 104 comprise a set of control buttons (e.g., a play button, a pause button, a rewind button, a fast-forward button, or any other appropriate control buttons). Controls 102 additionally comprise video elapsed time display 106 and video remaining time display 108. Controls 102 additionally comprise slider bar 110 and slider 112. In some embodiments, slider bar 110 comprises a slider bar for selecting a point in time within an output data set (e.g., a point in time within a media file). Slider bar 110 comprises a horizontal slider bar. In some embodiments, slider bar 110 comprises a vertical slider bar. In various embodiments, a user uses slider bar 110 to select a point within an output data set by making an indication to slider bar 110 (e.g., by clicking or touching on slider bar 110), by making an indication to slider 112 (e.g., by clicking and dragging or touching and dragging slider 112), or in any other appropriate way. In some embodiments, it is difficult for a user to precisely select a desired point within the output data set (e.g., a user may want to select a point within a two hour movie to an accuracy of a few seconds) due to the limited resolution of the slider bar.

Figure 1B:
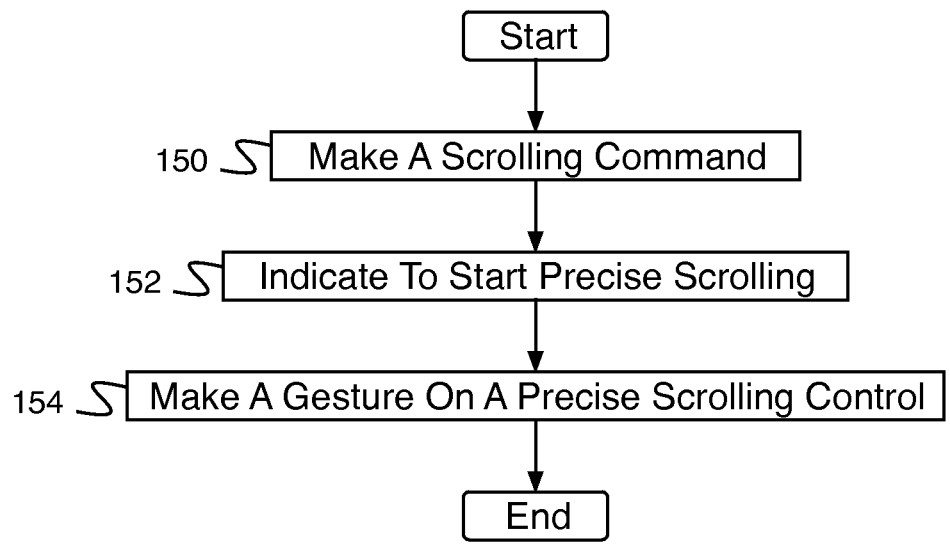
FIG. 1B is a flow diagram illustrating an embodiment of a process for scrolling.

FIG. 1B is a flow diagram illustrating an embodiment of a process for scrolling. In some embodiments, the process of FIG. 1B comprises a process for scrolling with a layered slider bar. In some embodiments, the process of FIG. 1B is used by a media player user for scrolling. In the example shown, in 150, a scrolling command is made—for example, the user indicates to a slider bar to scroll. In some embodiments, a scrolling command comprises an indication for a coarse selection of a point within an output data set. In 152, the user indicates to start precise scrolling. In some embodiments, an indication to start precise scrolling comprises an indication to a slider bar. In various embodiments, an indication to start precise scrolling comprises a slowing motion, a stopping motion, an orthogonal motion, a spreading out of fingers, an adding of a finger, or any other appropriate indication to start precise scrolling. In 154, a gesture on a precise scrolling control is made. In some embodiments, a gesture on a precise scrolling control comprises an indication for a precise selection of a point within an output data set (e.g., a command for selection of a point in time within an output data set with higher resolution than is achieved with a slider bar).

Figure 2:
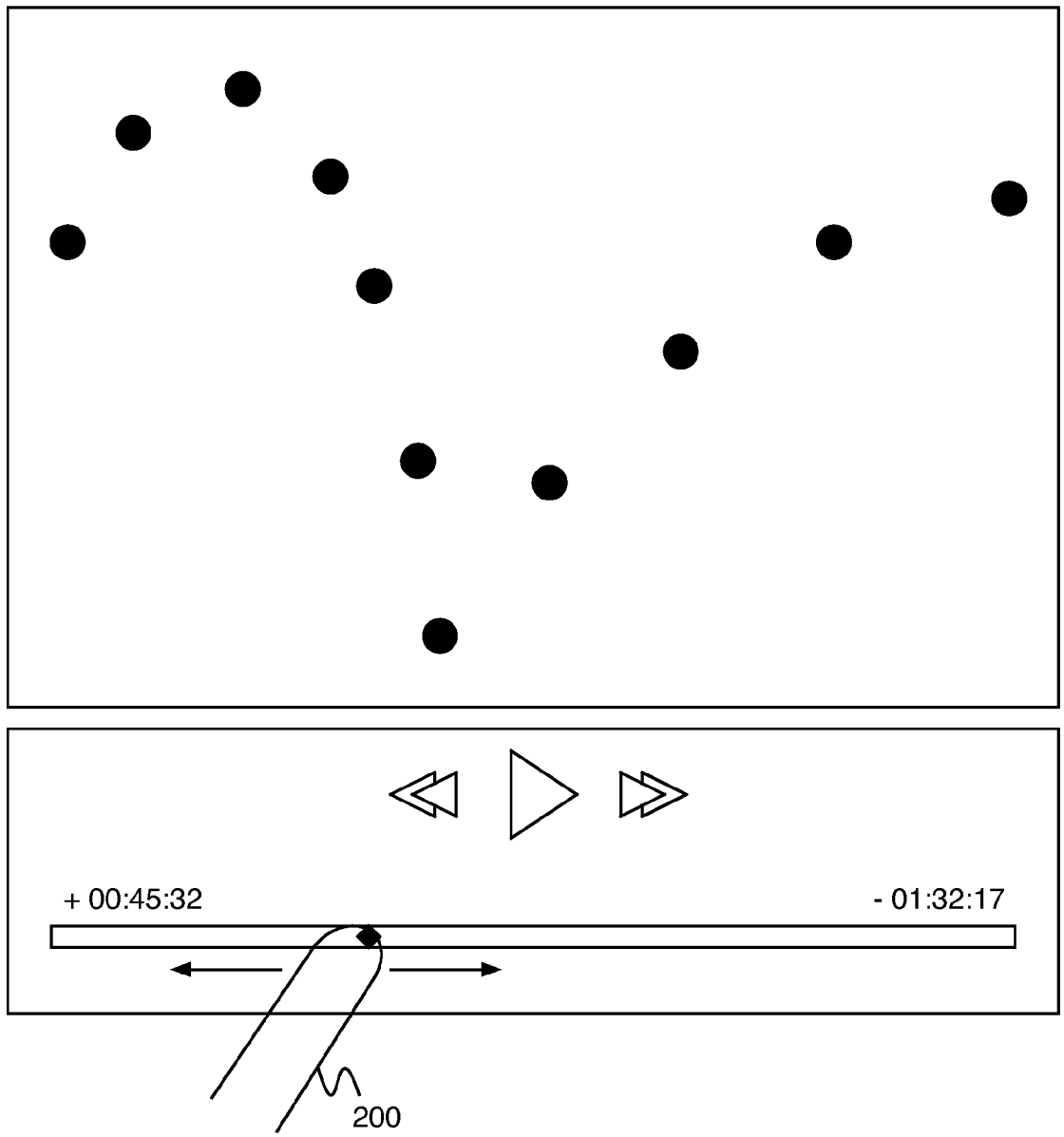
FIG. 2 is a diagram illustrating an embodiment of a user making a scrolling command.

FIG. 2 is a diagram illustrating an embodiment of a user making a scrolling command. In some embodiments, the diagram of FIG. 2 comprises media player 100 of FIG. 1A. In some embodiments, the diagram of FIG. 2 shows a user making a scrolling command to a video player application. In the example shown, the diagram of FIG. 2 comprises a touch-screen display—for example, a touch-screen display on a smartphone, a tablet computer, a laptop computer, etc. In some embodiments, a user makes a scrolling command using a mouse cursor, a track ball, a joy stick, a touch pad, etc. on a non-touch-screen display. In the example shown, a user makes a scrolling command using finger 200. In some embodiments, a scrolling command comprises touching a slider bar on a slider and dragging the slider to the left or to the right (e.g., in one direction along the slider or the other direction along the slider). In some embodiments, the slider follows the motion of finger 200 on the slider bar. In some embodiments, a scrolling command comprises touching a slider bar on a point other than on a slider (e.g., causing the slider to move to the point where the slider bar was touched). In some embodiments, touching a slider bar with a finger comprises a low-resolution input.

Figure 3:
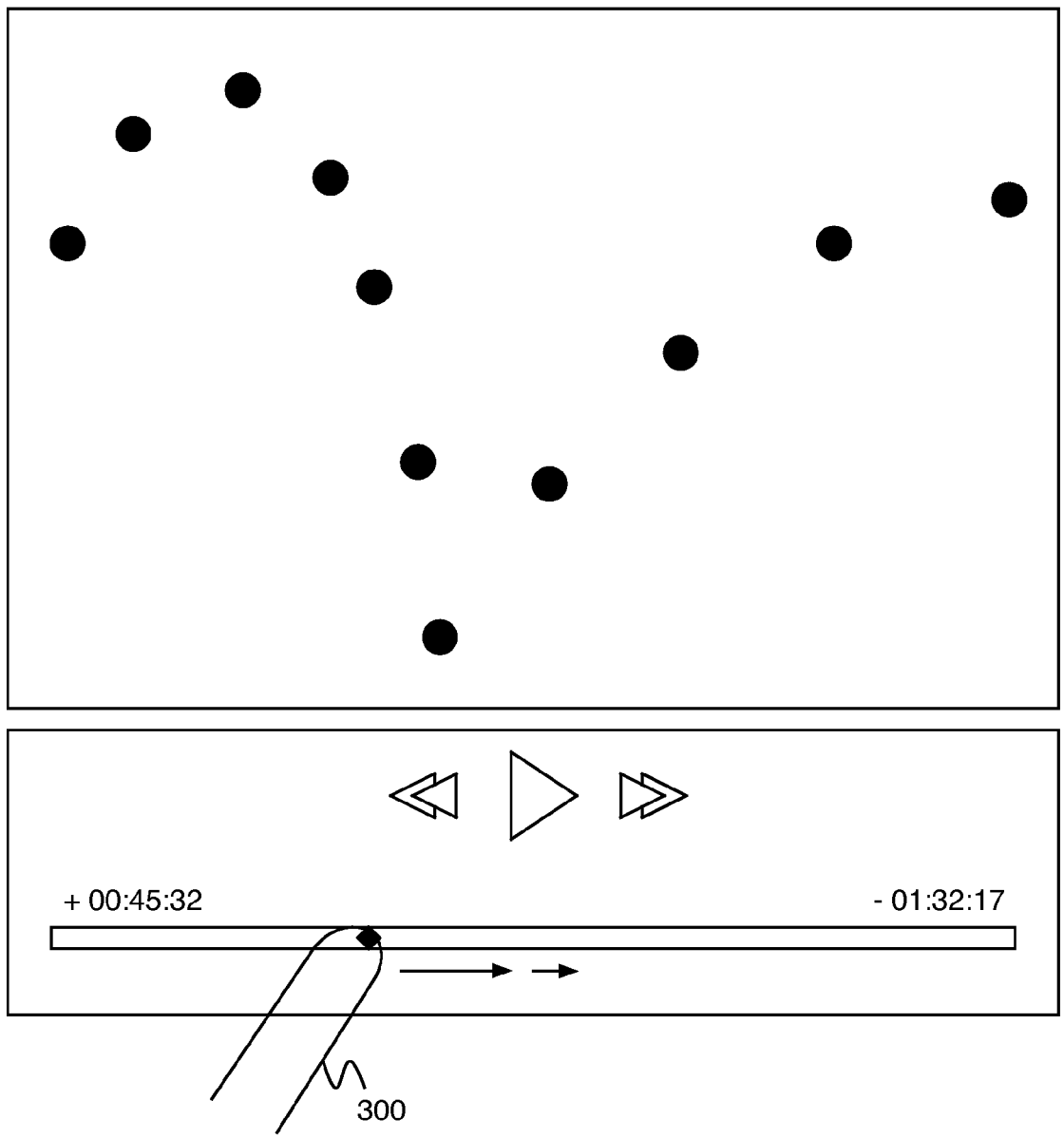
FIG. 3 is a diagram illustrating an embodiment of a user indicating to start precise scrolling.

FIG. 3 is a diagram illustrating an embodiment of a user indicating to start precise scrolling. In some embodiments, the diagram of FIG. 3 comprises media player 100 of FIG. 1A. In some embodiments, the diagram of FIG. 3 shows a user indicating to start precise scrolling after making a scrolling command to a video player application. In the example shown, arrows indicate finger travel speed. In the example shown, a user makes a scrolling command using finger 300. After a motion comprising a scrolling command, the user makes a slowing motion (e.g., the finger motion slows). The slowing motion comprises an indication to start precise scrolling.

Figure 4:
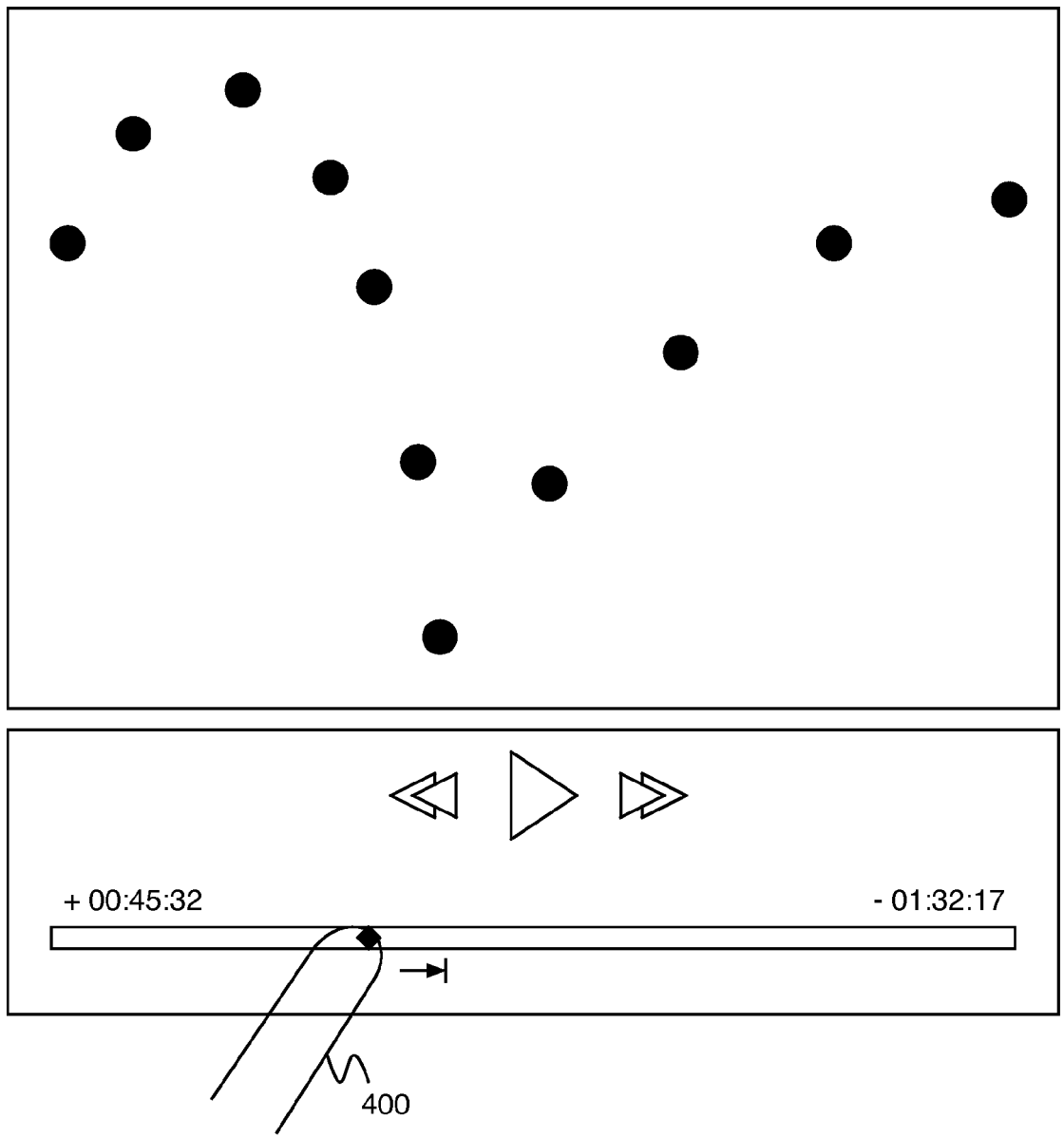
FIG. 4 is a diagram illustrating an embodiment of a user indicating to start precise scrolling.

FIG. 4 is a diagram illustrating an embodiment of a user indicating to start precise scrolling. In some embodiments, the diagram of FIG. 4 comprises media player 100 of FIG. 1A. In some embodiments, the diagram of FIG. 4 shows a user indicating to start precise scrolling after making a scrolling command to a video player application. In the example shown, a user makes a scrolling command using finger 400. After a motion comprising a scrolling command, the user makes a stopping motion (e.g., the finger motion stops for a period of time such as 0.5 sec, 1 sec, etc.). The stopping motion comprises an indication to start precise scrolling.

Figure 5:
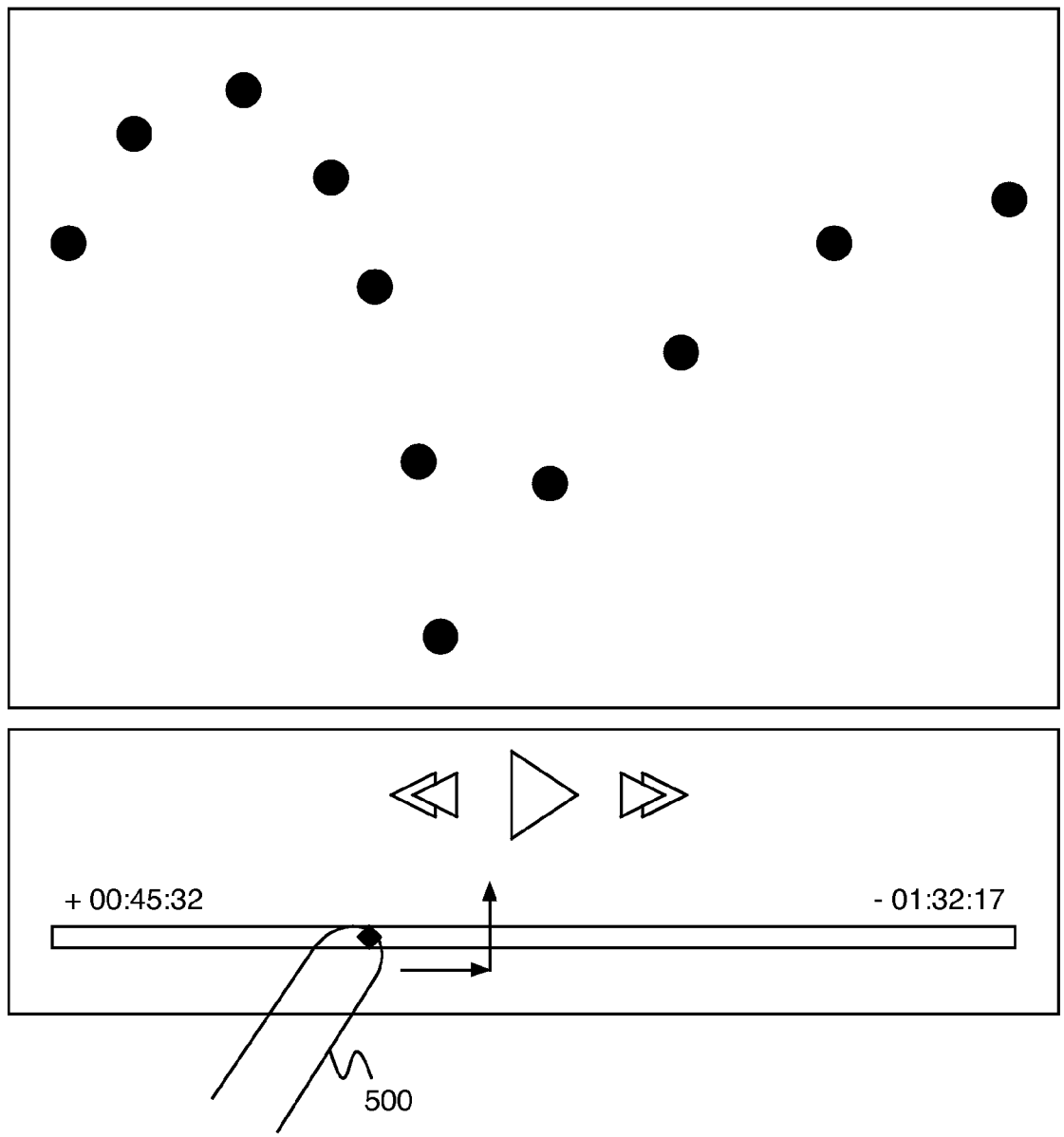
FIG. 5 is a diagram illustrating an embodiment of a user indicating to start precise scrolling.

FIG. 5 is a diagram illustrating an embodiment of a user indicating to start precise scrolling. In some embodiments, the diagram of FIG. 5 comprises media player 100 of FIG. 1A. In some embodiments, the diagram of FIG. 5 shows a user indicating to start precise scrolling after making a scrolling command to a video player application. In the example shown, a user makes a scrolling command using finger 500. After a motion comprising a scrolling command, the user makes an orthogonal motion (e.g., a motion in a direction orthogonal to the direction of the scrolling command). The orthogonal motion comprises an indication to start precise scrolling.

Figure 6:
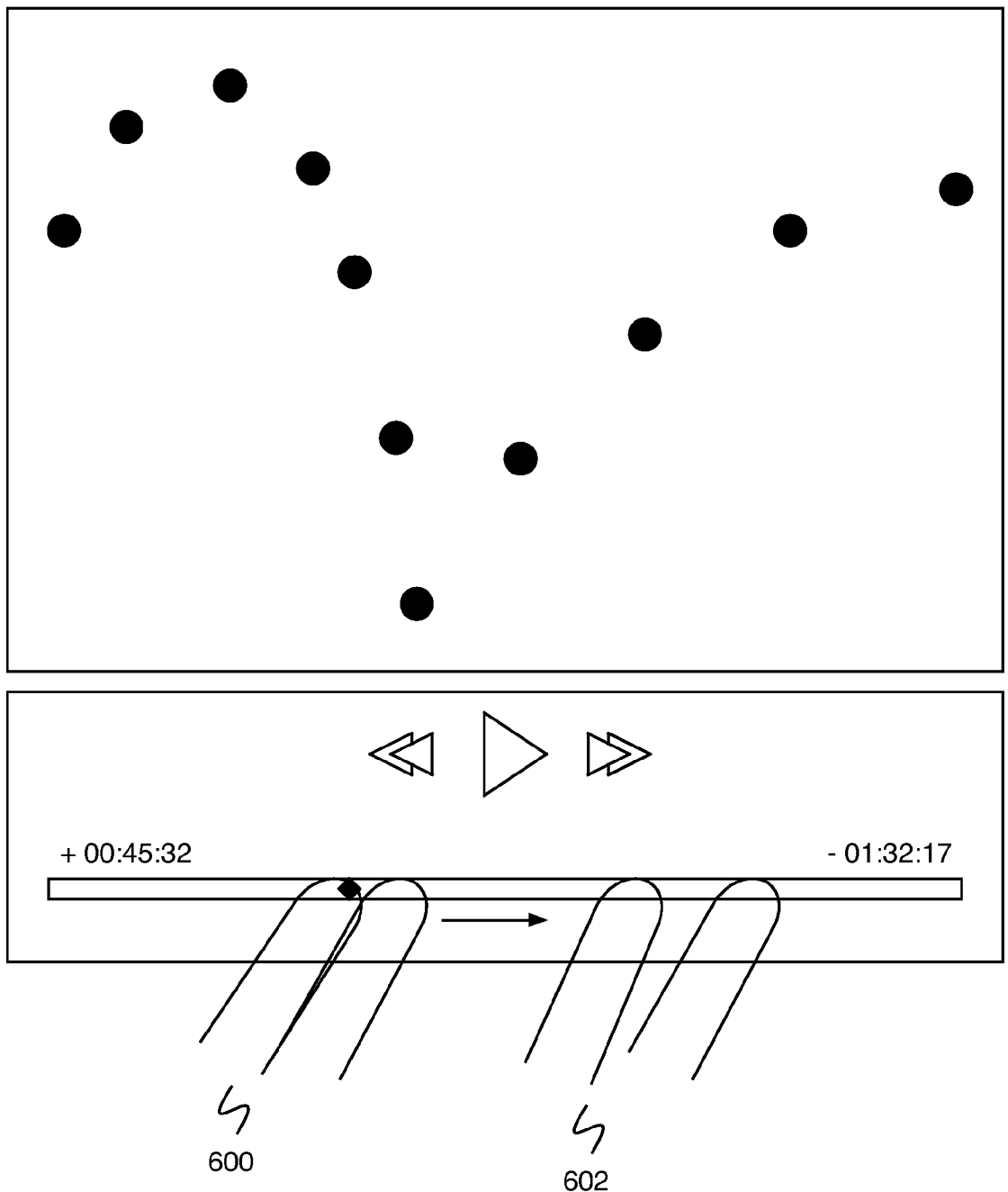
FIG. 6 is a diagram illustrating an embodiment of a user indicating to start precise scrolling.

FIG. 6 is a diagram illustrating an embodiment of a user indicating to start precise scrolling. In some embodiments, the diagram of FIG. 6 comprises media player 100 of FIG. 1A. In some embodiments, the diagram of FIG. 6 shows a user indicating to start precise scrolling after making a scrolling command to a video player application. In the example shown, a user makes a scrolling command using fingers 600 (e.g., a pair of fingers next to each other). After a motion comprising a scrolling command, the user separates the fingers (e.g., separates the fingers so they are no longer next to each other or are wider apart, e.g., fingers 602). The user separating the fingers comprises an indication to start precise scrolling.

Figure 7:
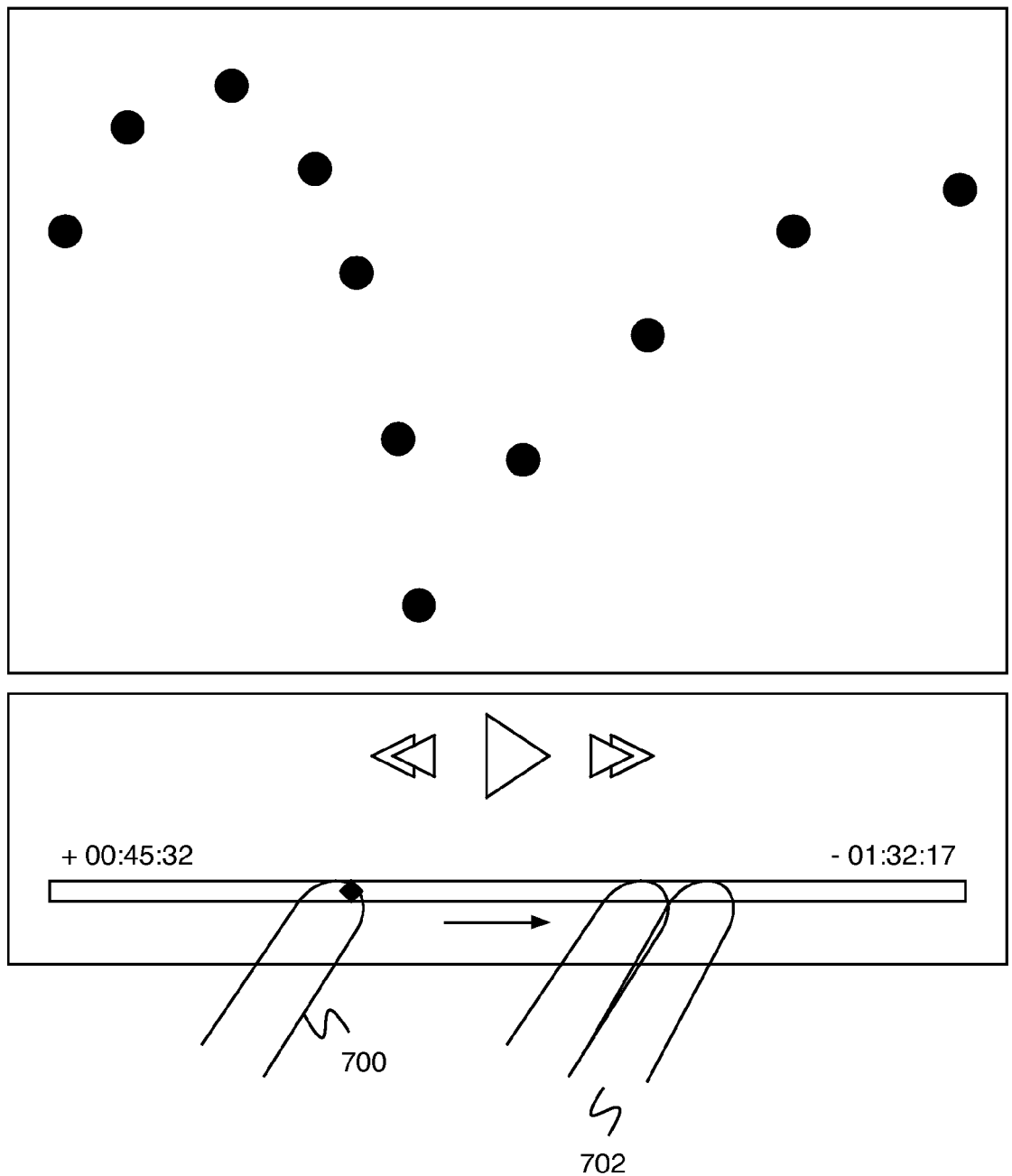
FIG. 7 is a diagram illustrating an embodiment of a user indicating to start precise scrolling.

FIG. 7 is a diagram illustrating an embodiment of a user indicating to start precise scrolling. In some embodiments, the diagram of FIG. 7 comprises media player 100 of FIG. 1A. In some embodiments, the diagram of FIG. 7 shows a user indicating to start precise scrolling after making a scrolling command to a video player application. In the example shown, a user makes a scrolling command using finger 700. After a motion comprising a scrolling command, the user places a second finger next to the first (e.g., placing a second finger on the surface such as fingers 702). The user placing the second finger next to the first comprises an indication to start precise scrolling.

Figure 8:
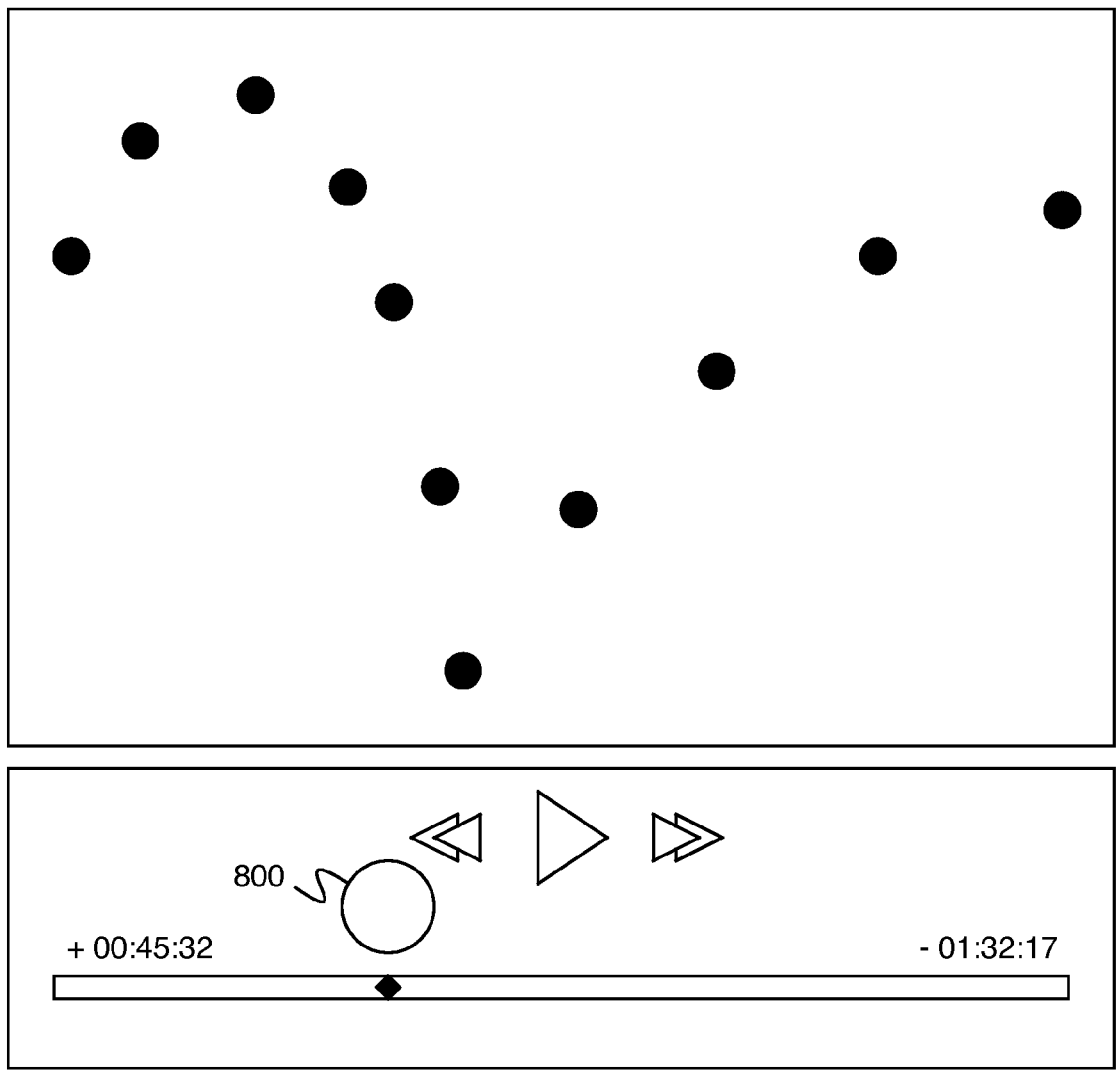
FIG. 8 is a diagram illustrating an embodiment of a precise scrolling control.

FIG. 8 is a diagram illustrating an embodiment of a precise scrolling control. In some embodiments, the diagram of FIG. 8 comprises media player 100 of FIG. 1A. In some embodiments, precise scrolling control 800 comprises a turnplate. In the example shown, the media player of FIG. 8 displays precise scrolling control 800 in response to an indication to start precise scrolling. A user executes precise scrolling by making a gesture on precise scrolling control 800. In some embodiments, a gesture on precise scrolling control 800 comprises a clockwise motion (e.g., rotating precise scrolling control 800 clockwise) or a counterclockwise motion (e.g., rotating precise scrolling control 800 counterclockwise). In some embodiments, the gesture on precise scrolling control 800 allows precise selection of a point within an output data set (e.g., precise selection of a point in time within a media file, e.g., an audio or video file). In some embodiments, a gesture rotating precise scrolling control clockwise moves a selection of a point in time within a media file forwards at a slow enough pace for precise selection. In some embodiments, a gesture rotating precise scrolling control counterclockwise moves a selection of a point in time within a media file backwards at a slow enough pace for precise selection. The rate of change of the value depends on the speed of rotation. In various embodiments, the slide bar is horizontal and the turnplate is above the slide bar, the slide bar is vertical and the turnplate is to the side of the slide bar (e.g., to the left), or any other appropriate arrangement of slide bar and turnplate.

Figure 9:
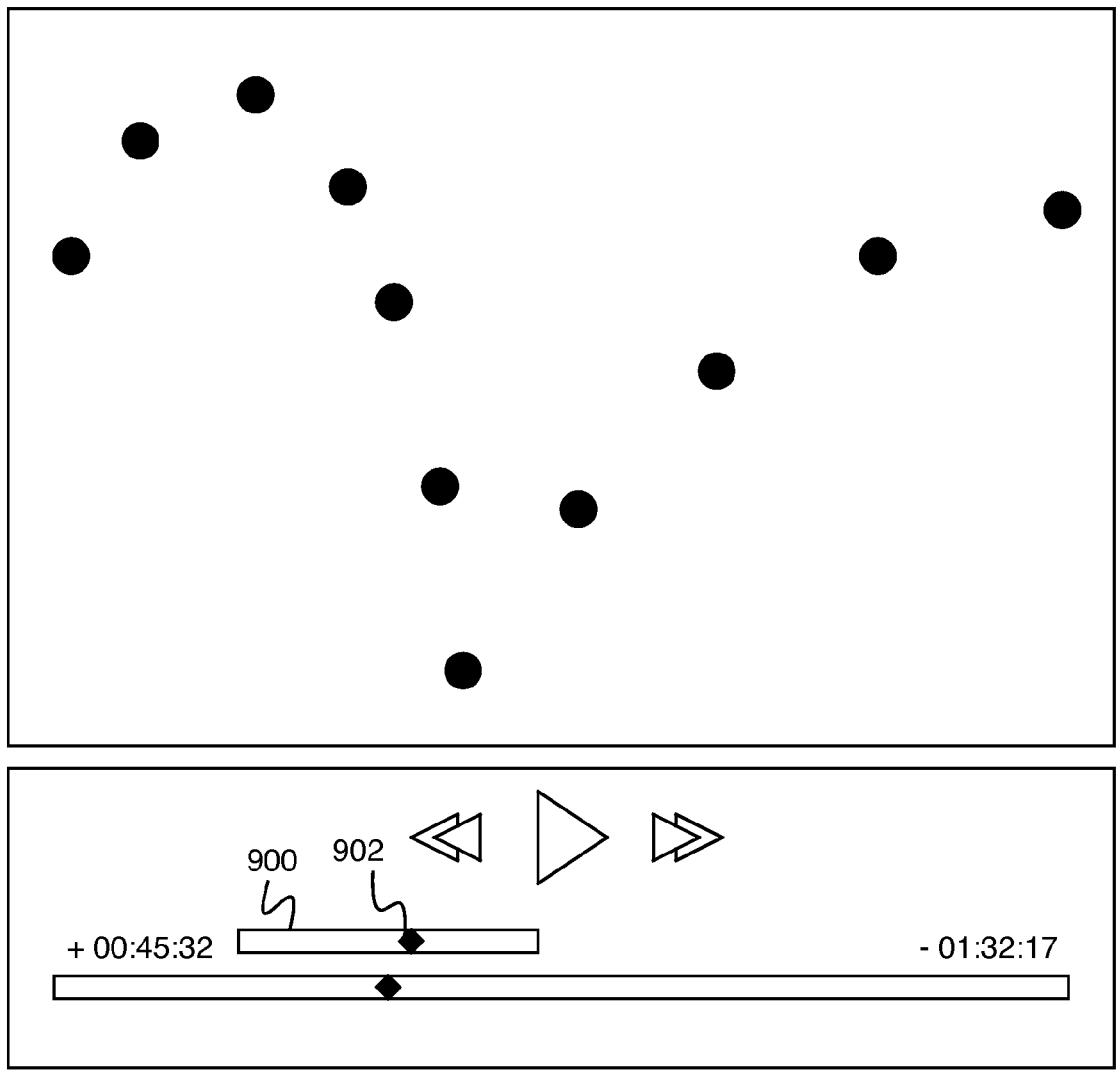
FIG. 9 is a diagram illustrating an embodiment of a precise scrolling control.

FIG. 9 is a diagram illustrating an embodiment of a precise scrolling control. In some embodiments, the diagram of FIG. 9 comprises media player 100 of FIG. 1A. In some embodiments, precise scrolling control 900 comprises a sub-slider bar. In the example shown, the media player of FIG. 9 displays precise scrolling control 900 in response to an indication to start precise scrolling. A user executes precise scrolling by making a gesture on precise scrolling control 900. In the example shown, precise scrolling control 900 comprises sub-slider 902. In some embodiments, a gesture on precise scrolling control 900 comprises dragging sub-slider 902 (e.g., dragging sub-slider 902 to the left or to the right or along the slider in one direction or another direction). In some embodiments, the gesture on precise scrolling control 900 allows precise selection of a point within an output data set (e.g., precise selection of a point in time within a media file, e.g., an audio or video file). In some embodiments, a gesture moving sub-slider 902 to the right (or along the slider in one direction) moves a selection of a point in time within a media file forwards at a slow enough pace for precise selection, and a gesture moving sub-slider 902 to the left (or along the slider in another direction) moves a selection of a point in time within a media file backwards at a slow enough pace for precise selection. In some embodiments, a gesture on precise scrolling control 900 comprises indicating an end of precise scrolling control 900 (e.g., placing a finger on the right end or on the left end or on one end or another end of precise scrolling control 900). In some embodiments, indicating an end of precise scrolling control 900 changes the scrolling speed of precise scrolling control 900 (e.g., indicating on the right end of precise scrolling control 900 increases the scrolling speed of precise scrolling control 900 and indicating on the left end of precise scrolling control 900 decreases the scrolling speed of precise scrolling control 900). In some embodiments, when precise scrolling control 900 is displayed (e.g., in response to an indication to start precise scrolling), sub-slider 902 is positioned at the middle of precise scrolling control 900. In various embodiments, the slide bar is horizontal and the sub-slider is above the slide bar, the slide bar is vertical and the sub-slider is to the side of the slide bar (e.g., to the left), or any other appropriate arrangement of slide bar and sub-slider.

Figure 10:
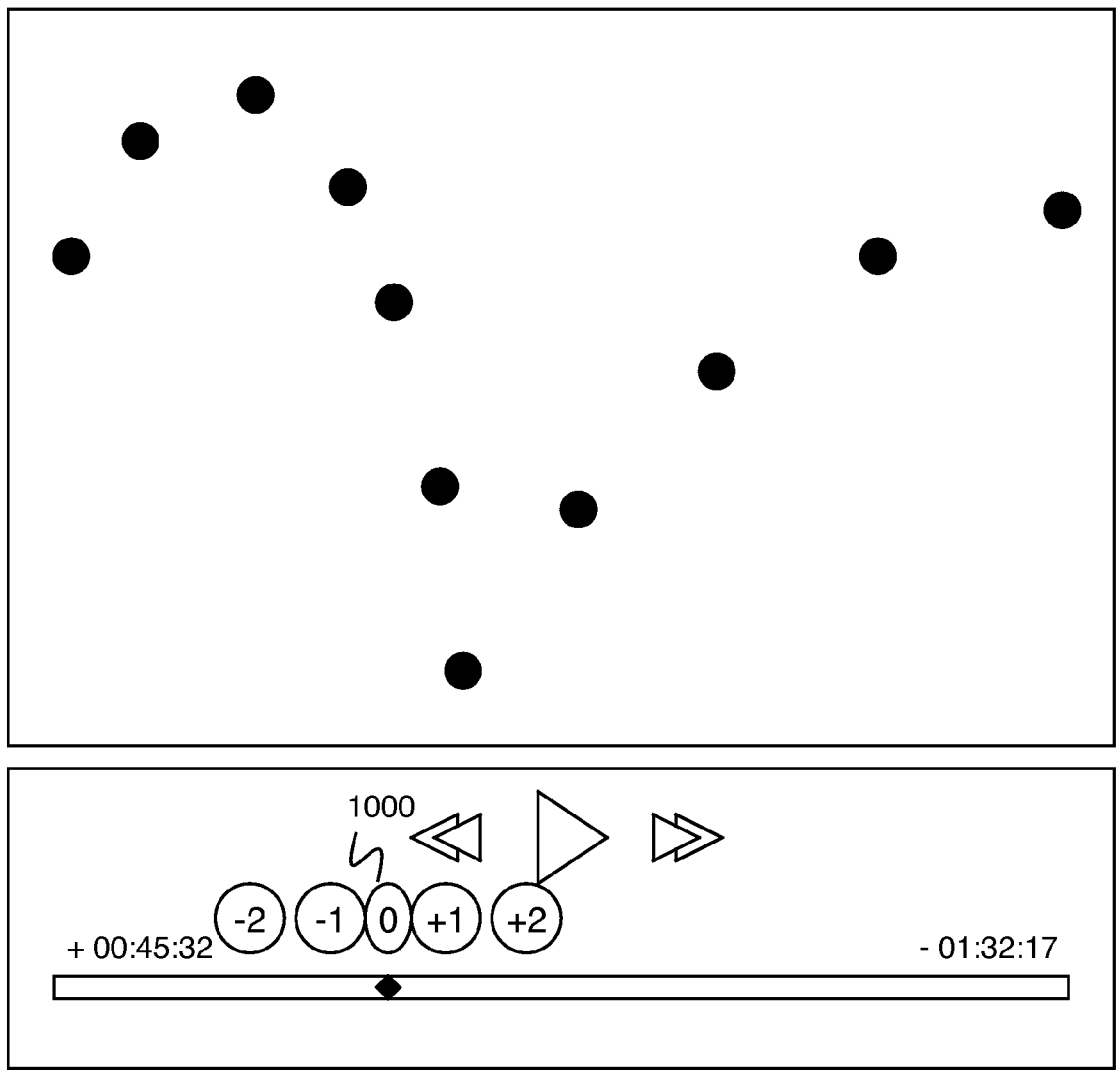
FIG. 10 is a diagram illustrating an embodiment of a precise scrolling control.

FIG. 10 is a diagram illustrating an embodiment of a precise scrolling control. In some embodiments, the diagram of FIG. 10 comprises media player 100 of FIG. 1A. In some embodiments, precise scrolling control 1000 comprises a spin control. In the example shown, the media player of FIG. 10 displays precise scrolling control 1000 in response to an indication to start precise scrolling. A user executes precise scrolling by making a gesture on precise scrolling control 1000. In some embodiments, a gesture on precise scrolling control 1000 comprises an indication (e.g., a click, a finger touch) on precise scrolling control 1000. In some embodiments, the gesture on precise scrolling control 1000 allows precise selection of a point within an output data set (e.g., precise selection of a point in time within a media file, e.g., an audio or video file). In some embodiments, a gesture on precise scrolling control 1000 to the right of the center moves a selection of a point in time within a media file forwards at a slow enough pace for precise selection. In some embodiments, a gesture on precise scrolling control 1000 to the left of the center moves a selection of a point in time within a media file backwards at a slow enough pace for precise selection. In some embodiments, the rate of change of selection of the point in time within the media file increases the further away from the center of precise scrolling control 1000 the gesture is made (e.g., gradations of precise scanning are selected using −2 and −1 in the backwards time direction and +1 and +2 in the forwards time direction, where +2 is forward faster than +1 but still with finer precision than the regular slider, and where −2 is backward faster than −1 but still with finer precision than the regular slider). In various embodiments, the slide bar is horizontal and the multispin control is above the slide bar, the slide bar is vertical and the multispin control is to the side of the slide bar (e.g., to the left), or any other appropriate arrangement of slide bar and multispin control.

Figure 11:
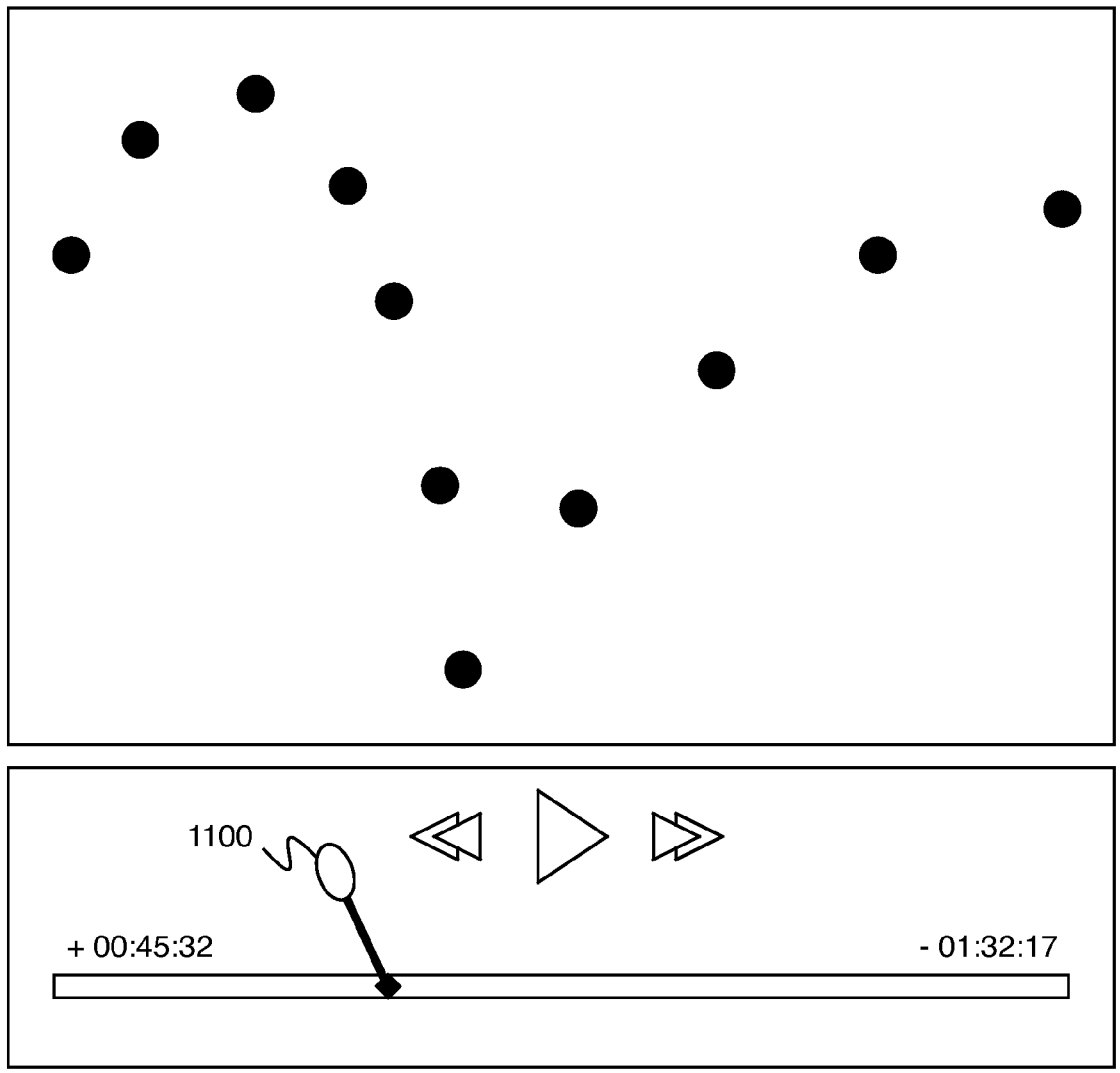
FIG. 11 is a diagram illustrating an embodiment of a precise scrolling control.

FIG. 11 is a diagram illustrating an embodiment of a precise scrolling control. In some embodiments, the diagram of FIG. 11 comprises media player 100 of FIG. 1A. In some embodiments, precise scrolling control 1100 comprises a rocking bar control. In the example shown, the media player of FIG. 11 displays precise scrolling control 1100 in response to an indication to start precise scrolling. A user executes precise scrolling by making a gesture on precise scrolling control 1100. In some embodiments, a gesture on precise scrolling control 1100 comprises an indication (e.g., a click and drag, a finger touch and drag) moving precise scrolling control 1100 to the left or to the right. In the example shown, precise scrolling control 1100 is pulled to the left. In some embodiments, the gesture on precise scrolling control 1100 allows precise selection of a point within an output data set (e.g., precise selection of a point in time within a media file, e.g., an audio or video file). In some embodiments, a gesture on precise scrolling control 1100 pulling precise scrolling control 1100 to the right of the center moves a selection of a point in time within a media file forwards at a slow enough pace for precise selection. In some embodiments, a gesture on precise scrolling control 1100 pulling precise scrolling control 1100 to the left of the center moves a selection of a point in time within a media file backwards at a slow enough pace for precise selection.

In some embodiments, the rate of change of selection of the point in time within the media file increases the further away from center precise scrolling control 1100 is pulled.

Figure 12:
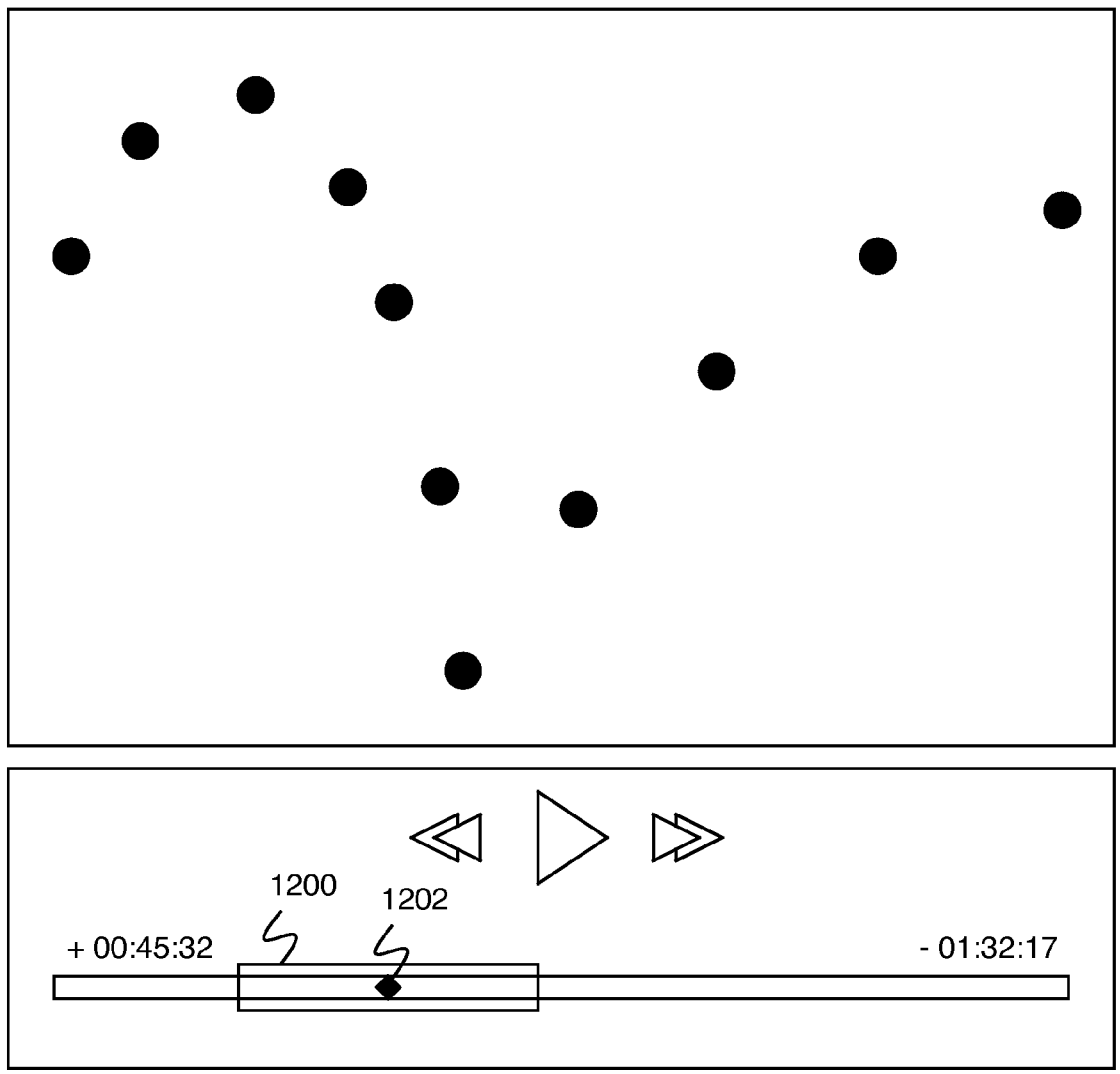
FIG. 12 is a diagram illustrating an embodiment of a precise scrolling control.

FIG. 12 is a diagram illustrating an embodiment of a precise scrolling control. In some embodiments, the diagram of FIG. 12 comprises media player 100 of FIG. 1A. In some embodiments, precise scrolling control 1200 comprises a modification to a base control (e.g., a modification to a slider bar). In the example shown, the media player of FIG. 12 displays precise scrolling control 1200 in response to an indication to start precise scrolling. Precise scrolling control 1200 comprises slider 1202. A user executes precise scrolling by making a gesture on precise scrolling control 1200. In the example shown, precise scrolling control 1200 comprises slider 1202. In some embodiments, a gesture on precise scrolling control 1200 comprises dragging slider 1202 (e.g., dragging slider 1202 to the left or to the right). In some embodiments, the gesture on precise scrolling control 1200 allows precise selection of a point within an output data set (e.g., precise selection of a point in time within a media file, e.g., an audio or video file). In some embodiments, a gesture moving slider 1202 to the right moves a selection of a point in time within a media file forwards at a slow enough pace for precise selection. In some embodiments, a gesture moving slider 1202 to the left moves a selection of a point in time within a media file backwards at a slow enough pace for precise selection. In some embodiments, a gesture on precise scrolling control 1200 comprises indicating an end of precise scrolling control 1200 (e.g., placing a finger on the right end or on the left end of precise scrolling control 1200). In some embodiments, indicating an end of precise scrolling control 1200 changes the scrolling speed of precise scrolling control 1200 (e.g., indicating on the right end of precise scrolling control 1200 increases the scrolling speed of precise scrolling control 1200 and indicating on the left end of precise scrolling control 1200 decreases the scrolling speed of precise scrolling control 1200). In some embodiments, when precise scrolling control 1200 is displayed (e.g., in response to an indication to start precise scrolling), slider 1202 is positioned at the middle of precise scrolling control 1200. In various embodiments, the slide bar and the modified portion of the slide bar are horizontal, the slide bar and the modified portion of the slide bar are vertical, or any other appropriate arrangement of slide bar.

Figure 13:
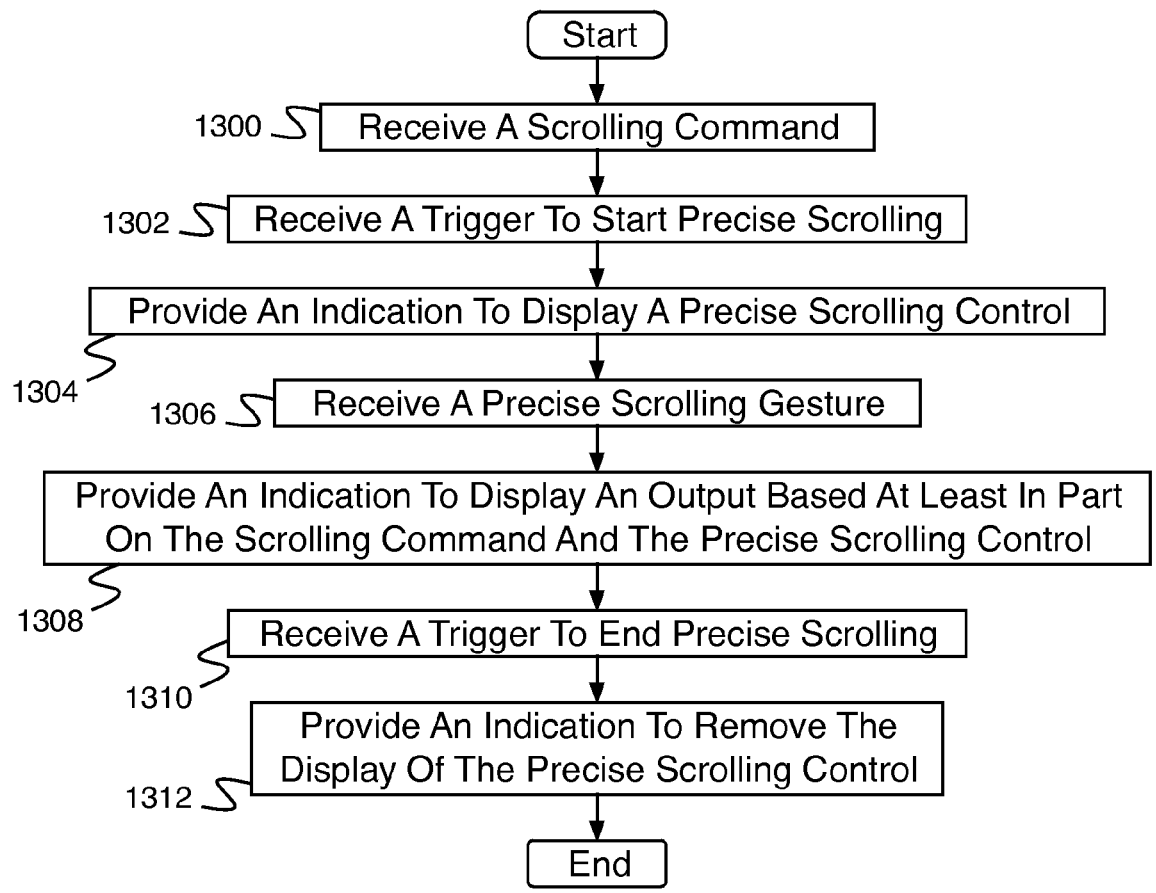
FIG. 13 is a flow diagram illustrating an embodiment of a process for scrolling.

FIG. 13 is a flow diagram illustrating an embodiment of a process for scrolling. In some embodiments, the process of FIG. 13 is executed by media player software (e.g., media player software providing a media player application as in media player 100 of FIG. 1A). In the example shown, in 1300, a scrolling command is received. In some embodiments, a scrolling command comprises a coarse scrolling command. In 1302, a trigger to start precise scrolling is received. In 1304, an indication to display a precise scrolling control is received. In 1306, a precise scrolling gesture is received. In 1308, an indication is provided to display an output based at least in part on the scrolling command and the precise scrolling control. In some embodiments, the output comprises an output positioned at a precise point in time within an output data set. In some embodiments, the output data set comprises a media file (e.g., an audio file, a video file, etc.). In some embodiments, the process ends. In some embodiments, in the event that a user desires to enter a new scrolling command (e.g., a new coarse scrolling command), the user provides a trigger to end precise scrolling. In 1310, a trigger to end precise scrolling is received. In various embodiments, a trigger to end precise scrolling comprises a motion away from the precise scrolling control, the trigger to start precise scrolling, a motion opposing the trigger to start precise scrolling, or any other appropriate trigger to end precise scrolling. In 1312, an indication is provided to remove the display of the precise scrolling control.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for scrolling, comprising:
   a processor configured for:
      selecting a first point within an output data set based on a coarse scrolling gesture using a slide bar;
      recognizing a trigger gesture to start precise scrolling;
      in the event that the trigger gesture to start precise scrolling is recognized:
         activating display of a precise scrolling control, wherein the precise scrolling control comprises a sub-slider bar, wherein the sub-slider bar has a first end and a second end; and
         recognizing a gesture to change scrolling speed of the sub-slider bar, wherein the gesture to change scrolling speed comprises at least one of indicating on the first end of the sub-slider bar to decrease scrolling speed and indicating on the second end of the sub-slider bar to increase scrolling speed;
      selecting a second point within the output data set based on a precise scrolling gesture using the precise scrolling control;
      determining an output based at least in part on the second point; and
   an interface configured for:
      providing the output for display.

2. A system as in claim 1, wherein the processor is further configured for receiving an end trigger gesture to end precise scrolling.

3. A system as in claim 2, wherein the end trigger gesture to end precise scrolling comprises a motion away from the precise scrolling control.

4. A system as in claim 2, wherein the end trigger gesture to end precise scrolling comprises the trigger gesture to start precise scrolling.

5. A system as in claim 2, wherein the end trigger gesture to end precise scrolling comprises a motion opposing the trigger gesture to start precise scrolling.

6. A system as in claim 2, wherein the processor is further configured for in the event that the end trigger gesture to end precise scrolling is recognized, removing display of the precise scrolling control.

7. A system as in claim 1, wherein the output comprises a video output corresponding to a time within the output data associated with the second point.

8. A system as in claim 1, wherein the trigger gesture to start precise scrolling comprises a slowing motion.

9. A system as in claim 1, wherein the trigger gesture to start precise scrolling comprises a stopping motion.

10. A system as in claim 1, wherein the trigger gesture to start precise scrolling comprises an orthogonal motion.

11. A system as in claim 1, wherein the trigger gesture to start precise scrolling comprises a spreading out of fingers.

12. A system as in claim 1, wherein the trigger gesture to start precise scrolling comprises adding a finger.

13. A system as in claim 1, wherein the precise scrolling control comprises a modification to the slide bar.

14. A system as in claim 13, wherein the modification to the slide bar comprises at least a portion of the slide bar being overlaid by at least a portion of the precise scrolling control.

15. A system as in claim 1, wherein the output comprises a video output.

16. A system as in claim 1, wherein the output comprises an audio output.

17. A system as in claim 1, wherein at least a portion of the sub-slider bar overlays at least a portion of the slide bar.

18. A system as in claim 1, wherein the slide bar is a horizontal slide bar or a vertical slide bar.

19. A system as in claim 1, wherein the precise scrolling control is displayed proximate a position on the slide bar, wherein the position is based at least in part on the trigger gesture to start precise controlling.

20. A method for scrolling, comprising:
  selecting, using a processor, a first point within an output data set based on a coarse scrolling gesture using a slide bar;
  recognizing a trigger gesture to start precise scrolling;
  in the event that the trigger gesture to start precise scrolling is recognized:
    activating display of a precise scrolling control, wherein the precise scrolling control comprises a sub-slider bar, wherein the sub-slider bar has a first end and a second end;
    recognizing a gesture to change scrolling speed of the sub-slider bar, wherein the gesture to change scrolling speed comprises at least one of indicating on the first end of the sub-slider bar to decrease scrolling speed and indicating on the second end of the sub-slider bar to increase scrolling speed;
    selecting a second point within the output data set based on a precise scrolling gesture using the precise scrolling control;
    determining an output based at least in part on the second point; and
    providing the output for display.

21. A computer program product for scrolling, the computer program product being embodied in a non-transitory computer readable storage medium and comprising computer instructions for:
  selecting, using a processor, a first point within an output data set based on a coarse scrolling gesture using a slide bar;
  recognizing a trigger gesture to start precise scrolling;
  in the event that a trigger gesture to start precise scrolling is recognized:
    activating display of a precise scrolling control, wherein the precise scrolling control comprises a sub-slider bar, wherein the sub-slider bar has a first end and a second end;
    recognizing a gesture to change scrolling speed of the sub-slider bar, wherein the gesture to change scrolling speed comprises at least one of indicating on the first end of the sub-slider bar to decrease scrolling speed and indicating on the second end of the sub-slider bar to increase scrolling speed;
    selecting a second point within the output data set based on a precise scrolling gesture using the precise scrolling control;
    determining an output based at least in part on the second point; and
    providing the output for display.

* * * * *